United States Patent [19]

Budrikis et al.

[11] Patent Number: 4,705,942

[45] Date of Patent: Nov. 10, 1987

[54] PRESSURE-SENSITIVE LIGHT PEN

[75] Inventors: Zigmantas L. Budrikis, Dalkeith, Australia; Mehdi Hatamian, Old Bridge, N.J.; Peter S. Kubik, Chatham, Mass.; Arun N. Netravali, Westfield, N.J.

[73] Assignee: American Telephone and Telegraph Company, AT&T Bell Laboratories, Murray Hill, N.J.

[21] Appl. No.: 813,586

[22] Filed: Dec. 26, 1985

[51] Int. Cl.$^4$ .............................................. G06K 7/10
[52] U.S. Cl. .................................. 250/227; 250/566; 235/472; 340/707
[58] Field of Search ............... 250/227, 555, 566, 568; 235/471-473; 340/706, 707

[56] References Cited

U.S. PATENT DOCUMENTS

| | | | |
|---|---|---|---|
| 3,271,515 | 9/1966 | Harper | 178/6.8 |
| 3,334,236 | 8/1967 | Bacon | 250/227 |
| 3,498,692 | 3/1970 | Jewitt et al. | 250/227 |
| 3,569,617 | 3/1971 | Allen et al. | 178/6 |
| 3,917,955 | 11/1975 | Inuiya | 250/549 |
| 3,920,959 | 11/1975 | Wefers et al. | 235/472 |
| 4,109,146 | 8/1978 | Hillman | 250/227 |
| 4,263,592 | 4/1981 | Takahashi et al. | 340/709 |
| 4,454,417 | 6/1984 | May | 250/216 |
| 4,490,607 | 12/1984 | Pease et al. | 250/227 |
| 4,575,627 | 3/1986 | Pease et al. | 250/227 |

OTHER PUBLICATIONS

"Moment Calculations by Digital Filters," *AT&T Bell Laboratories Technical Journal*, vol. 63, No. 2, Feb. 1984, Z. L. Budrikis and M. Hatamian, pp. 217–229.

*Primary Examiner*—Edward P. Westin
*Assistant Examiner*—Charles F. Wieland
*Attorney, Agent, or Firm*—Henry T. Brendzel

[57] ABSTRACT

A light pen which includes a transparent rod at its pointing end through which light is directed to a photodetector that is fixedly positioned within the light pen. The rod is spring loaded and axially slidable in response to applied pressure, resulting in different light intensities being applied to the photodetector and further resulting in an output voltage generated by the photodetector that is directly related to the applied pressure.

5 Claims, 4 Drawing Figures

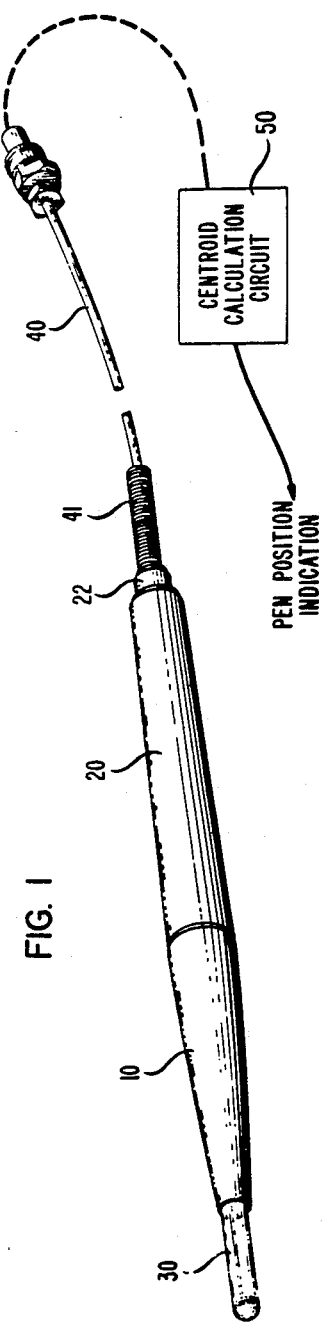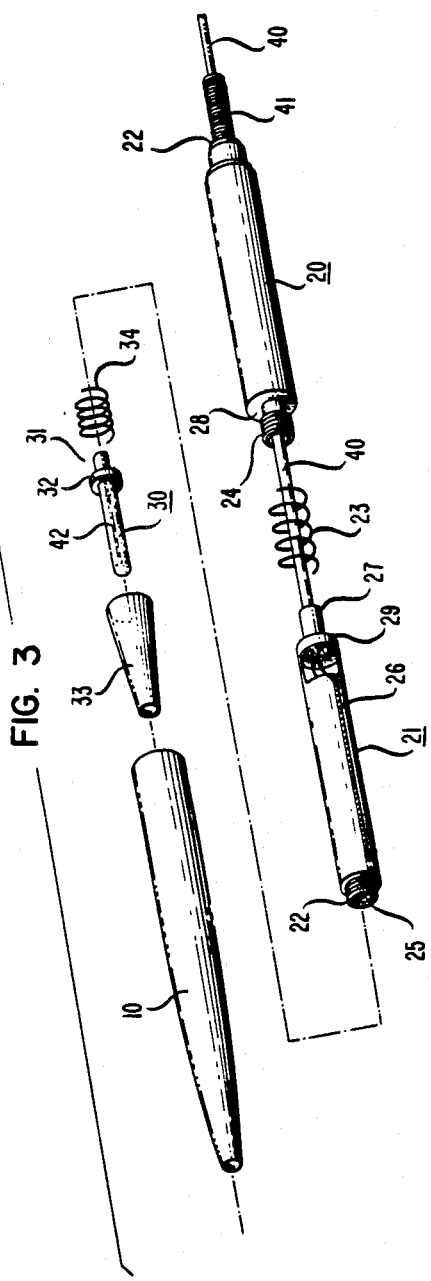

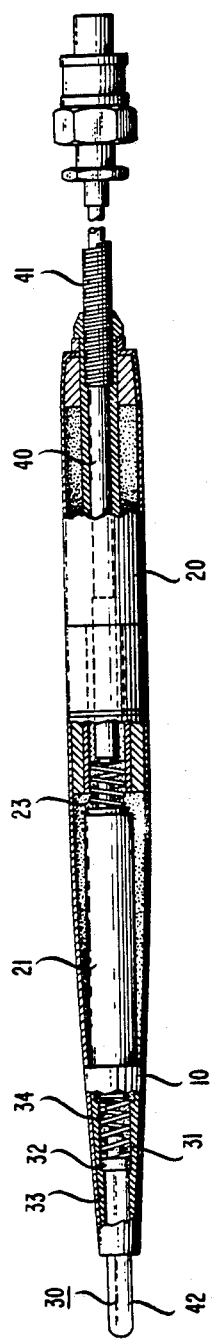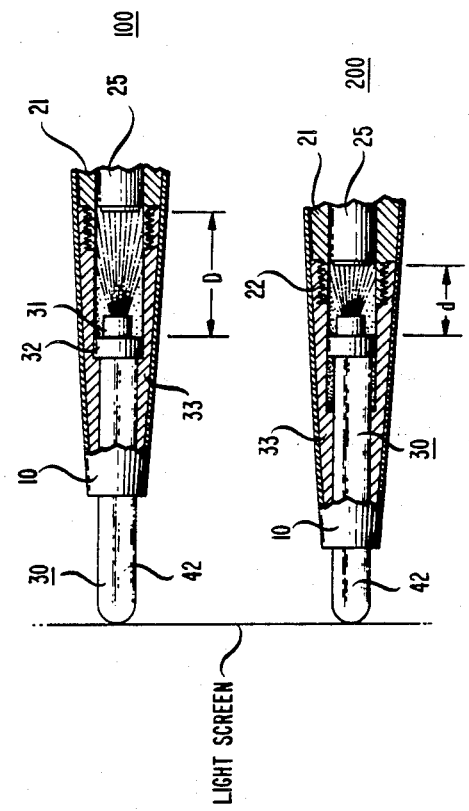

PRESSURE-SENSITIVE LIGHT PEN

BACKGROUND OF THE INVENTION

This invention relates to a new and improved light pen system for use with graphic displays. More particularly, it relates to a light pen having a new and improved design which permits continuous control of light pen output based on user applied pressure.

In the prior art, light pens have been used as a pointer device in association with computer controlled cathode-ray tube video displays. The pen is most often an object about the size and shape of a fountain pen and inlcudes a means for sensing light and a means for converting this light into an electrical pulse. The pen is pointed by hand to some portion of the picture on the screen, and when the electron beam which is tracing the image causes that portion of the sceen to light up, the pen senses the light and generates an electrical pulse which serves as a signal to the computer. Typically, the computer circuit responds to this signal by reading an address counter having data which tracks the position of the cathode ray at that particular instant. The address in the counter, thus, corresponds to the location on the screen to which the light pen points.

A light pen typically includes an elongated channel for directing light rays emanating from the video to a photodetector within the light pen. One example of a light pen can be found in U.S. Pat. No. 3,569,617 issued to Allen on Mar. 9, 1971. The light pen disclosed by Allen includes a collimation tube having an internal channel with non-reflective walls. Only light rays that are axially aligned with the channel are transmitted from the video screen to the photodetector. Non-axial light rays emitted from the screen are either not received through the channel opening or absorbed by the non-reflective walls of the channel. Various other light pens have been developed which include a lens for focusing the axially received light. Examples of such pens can be found in U.S. Pat. No. 3,271,515 issued Sept. 6, 1966 to Harper, U.S. Pat. No. 3,917,955 issued Nov. 4, 1975 to Inuiya and U.S. Pat. No. 4,454,417 issued June 12, 1984 to May.

These pens rely heavily on the ability to detect only the light coming from a small area. In addition to the issue of accepting narrow beams of light from the video screen, prior art light pens also address the issue of light pen activation. A light pen is normally kept electrically disconnected, or off, so that stray light impinging on the pen does not send an unwanted signal to the computer. Only when the light pen needs to be active does the user normally turn the pen "on". Although some light pens employ separate mechanical means to actuate the pen, improved means are disclosed in the Allen, Inuiya and May patents, in which the collimation tube is slidably mounted within an outer housing. When the user presses the collimation tube against the video screen, a miniature switch in the rear of the housing is actuated, thereby signaling the computer that the light pen is active.

None of the prior art light pens permit light from large areas to be accepted and none have means for controlling the electrical output of the pen in response to the pressure applied thereon, save for the on-off switching done by the aforementioned light pens. It is an object of this invention, therefore, to provide simple and effective means for translating the pressure applied on a light pen into a continuously variable control of the light pen output.

SUMMARY OF THE INVENTION

The object of this invention is achieved with a light pen arrangement, generally shaped like a conventional ball point pen, that includes a transparent rod protruding from the light pen in a manner similar to that of the protruding refill in a ball point pen. Also included within the pen is a photodetector that is mounted at a fixed distance from the end of the pen. A cable, connected to the photodetector, is extended through the end of the pen opposite the end containing the protruding rod, adapted to be connected to the electronic circuitry associated with our computer screen. The transparent rod has a rounded end at the "pointing" end, outside the pen, and a polished face at the opposite end, facing the photodetector.

Light entering the transparent rod at the pointing end is contained within the rod and travels through the rod until it exits at the polished end. At that point the light begins to disperse. Because of the dispersion, the amount of light reaching the photodetector is inversely related to the distance between the polished face of the transparent rod and the photodetector. Normally, the transparent rod is kept at its protruding position by the action of a spring which is situated within the pen and arranged to push the transparent rod outward. When pressure is applied on the pen, the transparent rod is pushed inward against the spring pressure. At that time, the polished end of the rod is closer to the photodetector and, consequently, more light is detected by the photodetector. The pen thus produces an output voltage that is directly proportional to the pressure applied on the pen.

BRIEF DESCRIPTION OF THE DRAWING

FIG. 1 illustrates the external structure of our light pen, as it is connected to a system that advantageously employs the output signal of our light pen.

FIG. 2 presents a cross-sectional view of our pen, and

FIG. 3 presents an exploded view of our pen.

FIG. 4 illustrates the different light intensities that impinge on photodetector 25 within our light pen as a function of the extension of rod 30 out of our light pen.

DETAILED DESCRIPTION

FIG. 1 illustrates the external structure of our light pen. It includes a tubular outer casing, or housing, that is made up of a front housing 10 and a back housing 20. Housing portions 10 and 20 are screwed together. Like conventional ball-point pens, our pen's outer housing can be constructed out of metal, plastic, or any other like substance. The far end of back housing 20 contains a porthole 22 to which a spring 41 is connected. An electrical cable 40 is extended through spring 41 and porthole 22 and into back housing 20. Spring 41 prevents cable 40 from bending (at its point of entry into the pen) at a radius that is too small from the reliable operation of the pen.

The near end of front housing 10 also contains a porthole, or an opening, through which a transparent rod 30 is extended. As described hereinafter in greater detail, rod 30 is mounted within the light pen of FIG. 1 in a manner that permits it to slide into the pen's body in response to pressure applied on the pen and communicated to rod 30 in a direction parallel to its axis and the axis of the pen.

The output of our light pen is applied, as shown in FIG. 1, to electronic circuits, 50, that amplify the light output, interpret it, and communicate to subsequent circuitry that controls, for example, the width of the meandering line drawn to follow the meandering movement of the light pen across the video screen. Alternatively, the light output can be used to control the color drawn on the video screen.

FIG. 2 presents a cross-sectional view of our pen, while FIG. 3 presents an exploded view. The parts internal to the pen are shown both in FIG. 2 and in FIG. 3, but the following discussion concentrates mostly on the FIG. 3 representation because of the ease with which the various elements can be identified. Thus, the internal parts of our pen are found in FIG. 3 between elements 10 and 20.

Element 21 is the largest element within the pen. Electrical cable 40 connects to the back of element 21, while appended to the front of element 21 is a photodetector 25 and rod 30 together with sleeve 33 and spring 34. More specifically, body element 21 is cylindrical in shape, with a radius smaller than the radius of the cylindrical cavity within the tubular front housing 10. The length of body element 21 is such that, when the pen is assembled, as shown in FIG. 2, the elements within the pen are securely positioned. At the back portion of body element 21 there is a hollow cylindrical nipple, or protrusion 27 of a radius slightly smaller than the radius of element 21. When our pen is constructed of a metallic material, protrusion 27 may advantageously be metallized. This is accomplished by constructing protrusion 27 out of copper or the like, or by sleeving a copper washer into protrusion 27 (not shown).

The front end of back housing 20 contains a hollow cylindrical protrusion 24, whose inside diameter is slightly greater than the outside diameter of protrusion 27. This allows protrusion 27 to slide within cylindrical protrusion 24 when our pen is assembled, as shown in FIG. 2. The outside diameter of protrusion 24 is larger than the diameter of body element 21, and the outside surface is threaded to permit the mating of back housing 20 with front housing 10. Because the outisde diameter of protrusion 24 is larger than its inside diameter, a washer-like surface 28 is created at the end of protrusion 24. A spring 23, interposed between body element 21 and housing element 20 is adapted to slide over protrusion 27 and rest on one end on body element 21 and, rest on the opposite end on surface 28. Thus, cable 40 passes through spring 41, porthole 22, housing element 20 (which has a through passage for cable 40), protrusion 24, spring 23, and hollow protrusion 27 before it reaches element 21.

Element 21 is made of a generally insulating material (electrically) and includes a cavity 29 at its juncture with protrusion 27 to allow the terminal end of cable 40 to reside within cavity 29. Along the length of body element 21 there exist two metallized strips 26 (only one of which is shown) that are diametrically positioned from each other. Each strip 26 extends from cavity 29 to the front portion of body element 21. Cable 40, which contains two wires enclosed in an electrically conductive shield, terminates with short exposed portions of the wire ("pigtails") within cavity 29. The shiled is connected to the metallized portion of protrusion 27, and the two pigtails are each connected to one of the metallized strips 26. When the pen is assembled as shown in FIG. 2, protrusion 27 extends into the cylindrical cavity of protrusion 24, spring 23 is compressed, and the shield of cable 40 makes electrical contact with protrusion 24. Consequently, when our pen is constructed out of a metallic substance, the above-described construction causes the pen to be at the electrical potential of the shield (e.g., electrical ground). Of course, when the pen is constructed from an electrically insulating material, the shield in cable 40 and the metallization of protrusion 27 may be dispensed with.

The front portion of body element 21 contains a hollow cylindrical protrusion 22 of a diameter smaller than that of element 21, whose outside surface is threaded. Metal strips 26 extend to within the cavity formed by the hollow portion of protrusion 22, and a conventional photodetector 25 is permanently affixed within that cavity and connected to metallized strips 26. Advantageously, photodetector 25 is centered on the axis of element 21 in a plane that is perpendicular thereto.

Sleeve 33 is adapted for screwing onto protrusion 22. It has a shape of a truncated cone, or a tapered cylinder, with a through passage centered along its axis. The diameter of the through passage has one value at the narrow end of the truncated cone, extending for a distance into the cone, and another and slightly larger value at the wide end of the cone. Viewed in another way, sleeve 33 is generally conical in shape with a bored hole centered on its axis that runs through the cone, and is countersunk for a distance from the base of the cone. The larger diameter countersinking is such that the inside surface can be threaded and mated with the threading of protrusion 22.

Rod 30, which is designed to be inserted into the through passage of sleeve 33, is generally cylindrical in shape. It may be made out of Plexiglas plastic sheets (which is a registered trademark of Rohm&Has Co. of Philadelphia, Pa.), or any other transparent material and includes a front section 42 that extends to about 75% of the length of rod 30, a back section 31 that extends for about 15% of the length of rod 30, and a cylindrical center section 32 extending for the remainder of rod 30. The front section 42 has a radius that is slightly smaller than the small radius in the through passage of sleeve 33, the center section 32 has a radius that is slightly smaller than larger radius in the through passage of sleeve 33, and the back section 31 has a radius that advantageously is about equal to the radius of front section 42. The free end of front section 42 is spherically rounded and polished to readily accept light from a computer CRT or the like. The free end of back section 31 is flat and also polished, with a surface that is perpendicular to the axis of rod 30.

Spring 34 has an inside diameter that is slightly larger than the radius of back section 31 and an outside diameter that is slightly smaller than the radius of the cylindrical cavity in protrusion 22. Of course, the radius of back section 31 is smaller than the radius of the cylindrical cavity by at least the thickness of the material making up spring 34.

When our pen is assembled, as shown in FIG. 2, one end of spring 34 is placed inside the cavity of protrusion 22, the back section of rod 30 is placed inside the other end of spring 34, and sleeve 33 is placed over the rod 30 - spring 34 assembly and screwed to protrusion 22. This causes spring 34 to be compressed, and the compression force exerted by spring 34 is communicated to rod 30 through the center section of rod 30 (section 32). This forces the front section of rod 30 to extend through sleeve 33. Front housing 10 sleeves over the entire assembly of spring 23, element 21, spring 34, rod 30 and sleeve 33 and attaches to back housing 20 by screwing onto the threaded surface of protrusion 28. As a result, rod 30 extends outside front housing 10.

In operation, when no pressure is applied in our light pen, rod 30 extends to the point where center section 32 reaches the smaller diameter hole bored through sleeve 33. This position, as illustrated in FIG. 4 with pen 100, results in a particular distance D between the polished flat end of rod 30 and the photodetector. When pressure is applied to our light pen, rod 30 is pushed inward, as illustrated in FIG. 4 with pen 200, and the distance between the polished flat end of rod 30 and the photodetector is reduced to d. Since light emanating from the end of rod 30 disperses with distance, less light impinges on the photodetector for light pen 100 than for light pen 200. The signal output of the ight pen is hence proportional to the applied pressure.

One of the features of our light pen is that a large amount of light is accepted by the photodetector. A transparent rod (30) is used to effect the aforementioned dispersion, but it also has the additional property of reflecting light off its cylindrical wall, which channels more light to the photodetector. The rounded tip of rod 30 increases the amount of light reaching the photodetector still further.

Such a condition, which is unacceptable to prior art light pens (and hence, they use only small openings and light channels of air rather than transparent materials of a higher index of refraction), is put to advantage in accordance with the principles of our invention by applying the output signal of our light pen to circuitry that utilizes the increased light. Specifically, circuit 50 (FIG. 1) takes the light output of the pen and calculates therefrom a highly accurate measure of our light pen's position.

The manner in which the above is accomplished may be more clearly understood when it is observed that the light coming from our pen is really a sequence of signals from those pixels on the CRT screen whose light manages to reach the photodetector. That sequence of signals represents a two-dimensional array of light intensities from pixels in the neighborhood of the point at which our light pen is aimed. Having such an array, a centroid of the array can be computed which provides a good indication of the point towards which our pen is directed. Computation of the centroid can be had with a circuit 50 created for that purpose, which is described in "Moment Calculations by Digital Filters," by Z. L. Budrikis and M. Hatamian, in BSTJ Vol. 63, No. 2, pp. 217-229, (February 1984).

Although the operation of our pen is described in connection with a CRT display, it should be understood that our light pen can easily be employed in different circumstances without departing from the spirit and scope of our invention. For example, instead of relying on a CRT beam to provide a light to the photodetector which would identify the pen's position, a pad having fine cross marks in the conventional x and y directions can be used, and the photodetector can be caused to detect transitions across the cross marks. The light source can be ambient light or a light source built into the light pen.

What is claimed is:

1. A light pen assembly comprising:
a tubular front housing having a first opening formed in its front end and a second opening formed in its back end, said second opening forming a first threaded surface;
a tubular back housing having a third opening formed in its back end and a fourth opening formed in its front end, said third opening forming a second threaded surface adapted for screwing to said first threaded surface;
a collimation rod slidably mounted within said front housing and projecting outwardly from said first opening, said rod being essentially transparent and including: a cylindrical detainer section for controlling said outward projection of said rod, an outside end for accepting light into said rod, and an inside end for emitting and dispersing light accepted by said first end;
resilient means for allowing said collimation rod to slide inwardly into said housing in response to axially applied pressure and for returning said collimation rod in its outwardly projecting position when pressure is removed;
a photodetector means fixedly mounted within said front housing and axially aligned with said collimation rod for developing a voltage in response to light emitted and dispersed by said inside end of said collimation rod and impinging on said photodetector means, the analog level of said voltage representing a measure of said axially applied pressure and providing a continuously variable control of the output signal of said light pen in response to said applied pressure; and
means for extending said voltage outside said pen via said fourth opening in said back housing.

2. A light pen comprising:
an essentially transparent movable rod protruding from a writing end of said light pen having a first surface at one end of said rod adapted for accepting light; and a second surface at an end of said rod opposite said first end adapted for emitting and dispersing light accepted by said first end, said second surface being perpendicular to the axis of said rod;
means for moving said rod toward said photodetector in proportion to said pressure applied to said light pen along said axis of said rod and for retracting said rod to its original protruded position upon removal of said pressure; and
a photodetector means mounted in said light pen at a fixed distance from said writing end substantially in line with said axis of said rod, including an electrical line extending outside said light pen, for developing a useful and usable voltage output on said electrical line that is continually and directly responsive to said applied pressure.

3. The light pen assembly of claim 2 further including means for amplifying said voltage developed by said photodetector means to provide a control signal whose magnitude is proportional to said applied pressure.

4. The system assembly of claim 2 wherein the front end of said rod is of a generally semispherical shape to permit more light to enter said rod.

5. A light pen system comprising:
a light pen for developing an output signal in response to light accepted by said pen, said pen including a collimation rod slidably mounted within said pen and projecting outwardly from an opening of said pen, with said rod adapted to slide into said pen in response to applied pressure, resiliently slide out of said pen in response to removal of said pressure, and disperse the light flowing through the end of said rod within said pen, said pen further including a photodetector for detecting light dispersed by said rod and developing an output signal proportional to the intensity of the detected light, said intensity being proportional to applied pressure; and means responsive to said output signal for computing the centroid of said output signal.

* * * * *